(12) United States Patent
Downer

(10) Patent No.: US 6,532,982 B2
(45) Date of Patent: Mar. 18, 2003

(54) METHODS AND APPARATUS FOR FILTERING WATER WITH REMOVABLE FILTER ASSEMBLY

(75) Inventor: Stephen M. Downer, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/749,848

(22) Filed: Dec. 28, 2000

(65) Prior Publication Data

US 2002/0174901 A1 Nov. 28, 2002

(51) Int. Cl.[7] ............................................. E03B 7/07
(52) U.S. Cl. .................... 137/15.08; 137/544; 137/801; 4/678
(58) Field of Search ................. 137/544, 801, 137/357, 359, 15.01, 15.08; 210/418, 429; 4/678

(56) References Cited

U.S. PATENT DOCUMENTS

| | | | | |
|---|---|---|---|---|
| 2,143,655 A | * | 1/1939 | Heller | 137/801 |
| 4,207,916 A | * | 6/1980 | Hayes | 137/171 |
| 4,337,790 A | | 7/1982 | Buchner | 137/550 |
| 5,020,569 A | * | 6/1991 | Agresta | 137/544 |
| 5,510,031 A | | 4/1996 | Knauf, Jr. et al. | 210/460 |
| 5,865,209 A | * | 2/1999 | Vidal | |
| 5,983,938 A | | 11/1999 | Bowers et al. | 137/625.17 |

* cited by examiner

Primary Examiner—A. Michael Chambers
(74) Attorney, Agent, or Firm—Armstrong Teasdale LLP

(57) ABSTRACT

A faucet assembly is mounted to a mounting surface and is coupled to a filter assembly that is replaceable both above and below the mounting surface. The faucet assembly includes a faucet including a valve to control the flow rate of water and a base attached to the mounting surface. The filter assembly is disposed beneath the mounting surface and includes a filter and a flexible water line connected to a water source. The filter assembly is sized to fit through an opening in the mounting surface.

17 Claims, 3 Drawing Sheets

METHODS AND APPARATUS FOR FILTERING WATER WITH REMOVABLE FILTER ASSEMBLY

BACKGROUND OF THE INVENTION

This invention relates generally to water faucet assemblies and more particularly, to water faucet assemblies including water filters.

Water faucet assemblies that filter water include water filters that are attached in flow communication to a water source used to supply water to the water faucet assemblies. Such faucet assemblies are typically mounted to a base, such as a countertop. At least one type of known filter assembly is mounted below the countertop and includes a first line extending between the filter assembly and the faucet assembly and a second line extending between the filter assembly and a water supply line. See, for example, U.S. Pat. No. 5,983,938. Such filter assemblies may be disconnected from the water lines and replaced from below the countertop.

Other known filter assemblies are attached to the water faucet and are adjacent and below the base of the water faucet. See, for example, U.S. Pat. No. 5,510,031. Such filter assemblies are only replaceable from above the countertop after the water faucet assembly has been removed. Other such filter assemblies are stand alone units that include T-fittings that divert a flow of water from being supplied to the water faucet assembly to a separate stand-alone countertop filter unit. Such countertop filter units occupy countertop space and include filters that are replaceable from above the countertop.

BRIEF SUMMARY OF THE INVENTION

In an exemplary embodiment, a faucet assembly is mounted to a mounting surface and is coupled to a filter assembly that is removable from above and below the mounting surface. The faucet assembly includes a faucet including a valve to control a flow rate of water and a base attached to the mounting surface. The filter assembly is disposed beneath the mounting surface and includes a filter and a flexible water line connected to a water source. The filter assembly is sized to fit through an opening in the mounting surface.

The combination of the filter assembly and the flexible water line permit the filter assembly to be moved from beneath the mounting surface to above the mounting surface via the mounting surface opening, after the faucet assembly is uncoupled from the mounting surface. Accordingly, because the filter assembly is sized to be inserted through the mounting surface opening, the filter may be replaced either from above or below the mounting surface.

DETAILED DESCRIPTION OF THE INVENTION

Figure 1:
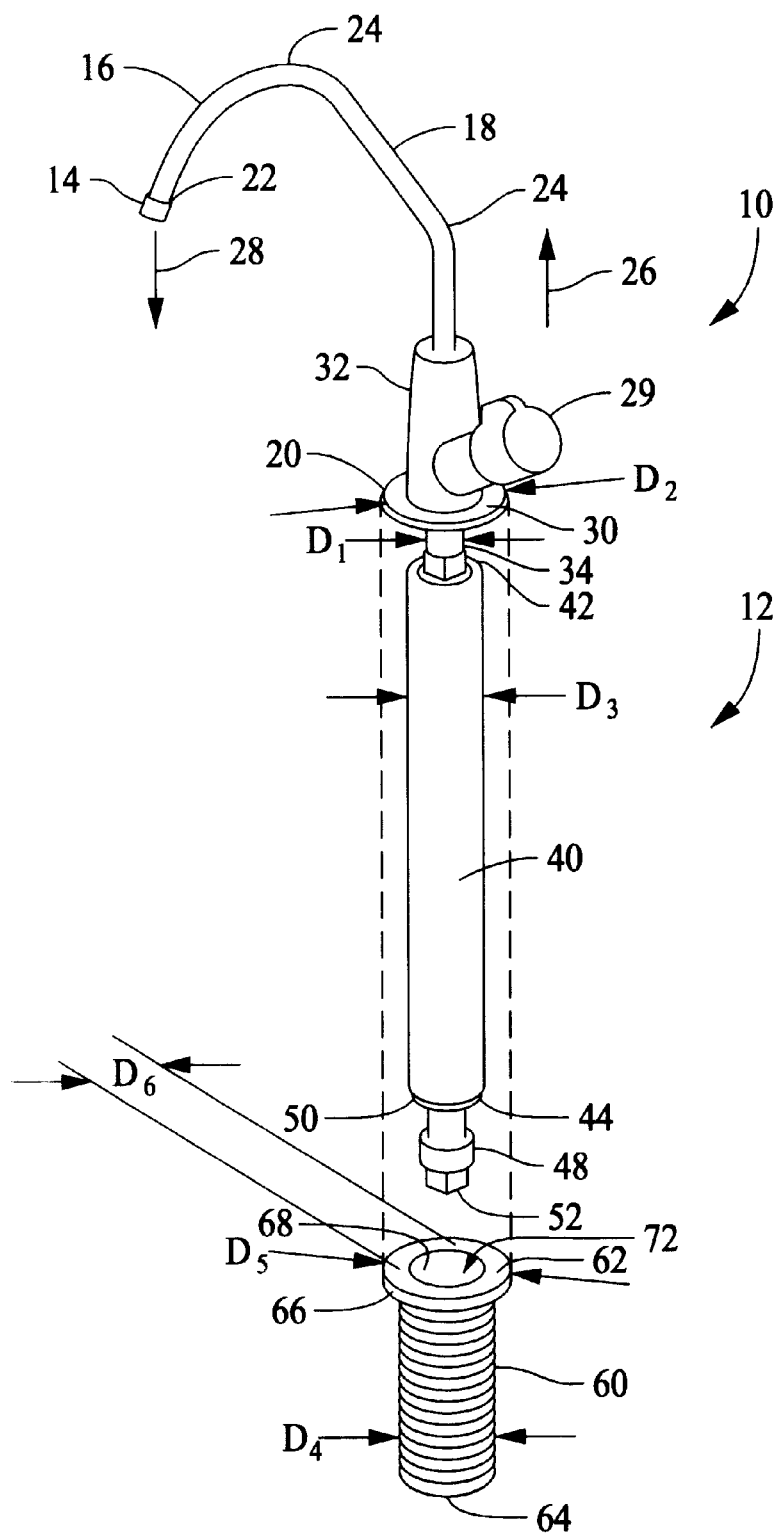
FIG. 1 is a partial exploded perspective view of a faucet assembly including a filter assembly.

FIG. 1 is a partial exploded perspective view of a faucet assembly 10 connected to a filter assembly 12. Faucet assembly 10 includes an aerator 14, a spout 16, an arm 18, and a base 20. Aerator 14 is connected in flow communication to an end 22 of faucet assembly arm 18 and channels water exiting faucet assembly arm 18 into a directed flow (not shown). Arm 18 extends substantially perpendicularly from base 20 and is in flow communication with base 20. In an exemplary embodiment, arm 18 includes a plurality of bends 24 of varying degree to change a direction of water flowing through arm 18, such that water flowing from base 20 into arm 18 in a first direction 26 is redirected to exit arm 18 in a second direction 28 that is substantially opposite first direction 26.

Base 20 permits faucet assembly 10 to be secured to a mounting surface or base (not shown in FIG. 1) and includes a valve 29. Valve 29 is rotatably coupled to base 20 and is selectively rotatable to control a flow of water entering faucet assembly 10. Specifically, rotating valve 29 in a clock-wise direction increases an amount of water entering base 20 and flowing into faucet assembly arm 18. Rotating valve 29 in a counter-clockwise direction progressively decreases an amount of water entering base 20 and when valve 29 is fully rotated counter-clockwise water is prevented from entering faucet assembly 10.

Base 20 also includes a top surface 30, a bottom surface (not shown in FIG. 1), an arm extension 32, and an pipe extension 34. Arm extension 32 extends substantially perpendicularly from base top surface 30 and tapers toward arm 18. Valve 29 is rotatably coupled to faucet assembly 10. The base bottom surface is substantially planar and pipe extension 34 extends substantially perpendicularly from the base bottom surface. Pipe extension 34 has a diameter $D_1$ that is smaller than a diameter $D_2$ of base 20. Pipe extension diameter $D_1$ is also less than a diameter (not shown in FIG. 1) of an opening (not shown in FIG. 1) disposed within the mounting surface. Base diameter $D_2$ is larger than the mounting surface opening and as such, when faucet assembly 10 is secured to the mounting surface, base 20 mounts flush against the mounting surface and pipe extension 34 extends into the mounting surface opening.

Pipe extension 34 is threaded and extends between filter assembly 12 and the bottom surface of base 20 (not shown in FIG. 1). Filter assembly 12 includes a filter 40 that has a first end 42 and a second end 44. Filter 40 has a substantial tubular cross-sectional profile and attaches to filter assembly 12 in flow communication with a water source (not shown in FIG. 1). Filter first end 42 is connected to pipe extension 34 and filter second end 44 is connected to a coupling 48. Coupling 48 has a first end 50 and a second end 52. Second end 52 is connected to a flexible water line (not shown in FIG. 1) and first end 50 is coupled to filter second end 44. Filter assembly 12 has a diameter $D_3$ that is smaller than base diameter $D_2$.

An interlock 60 secures faucet assembly 10 to the mounting surface. Interlock 60 includes a first end 62 and a threaded second end 64. A connection ring 66 is disposed at interlock first end 62. Connection ring 66 includes a plurality of threads (not shown) disposed on an inner surface 68 of interlock 60. The connection ring threads permit connection ring 66 to interlock with faucet assembly base 20.

Interlock second end 64 has a diameter $D_4$ sized to receive a locking nut (not shown) used to secure faucet assembly 10 to the mounting surface (not shown in FIG. 1). Faucet assembly 10 attaches to connection ring 66, and specifically, rotating base 20 in a clock-wise direction secures faucet assembly 10 to connection ring 66 of interlock 60. Connection ring 62 has a diameter $D_6$ and an opening 72 extending through interlock 60. Opening 72 has a diameter $D_6$ that is less than connection ring diameter $D_5$. Opening diameter $D_6$ is larger than filter diameter $D_3$ and accordingly, filter assembly 12 extends through opening 72 to permit interlock connection ring 62 to interlock with faucet assembly 10.

Figure 2:
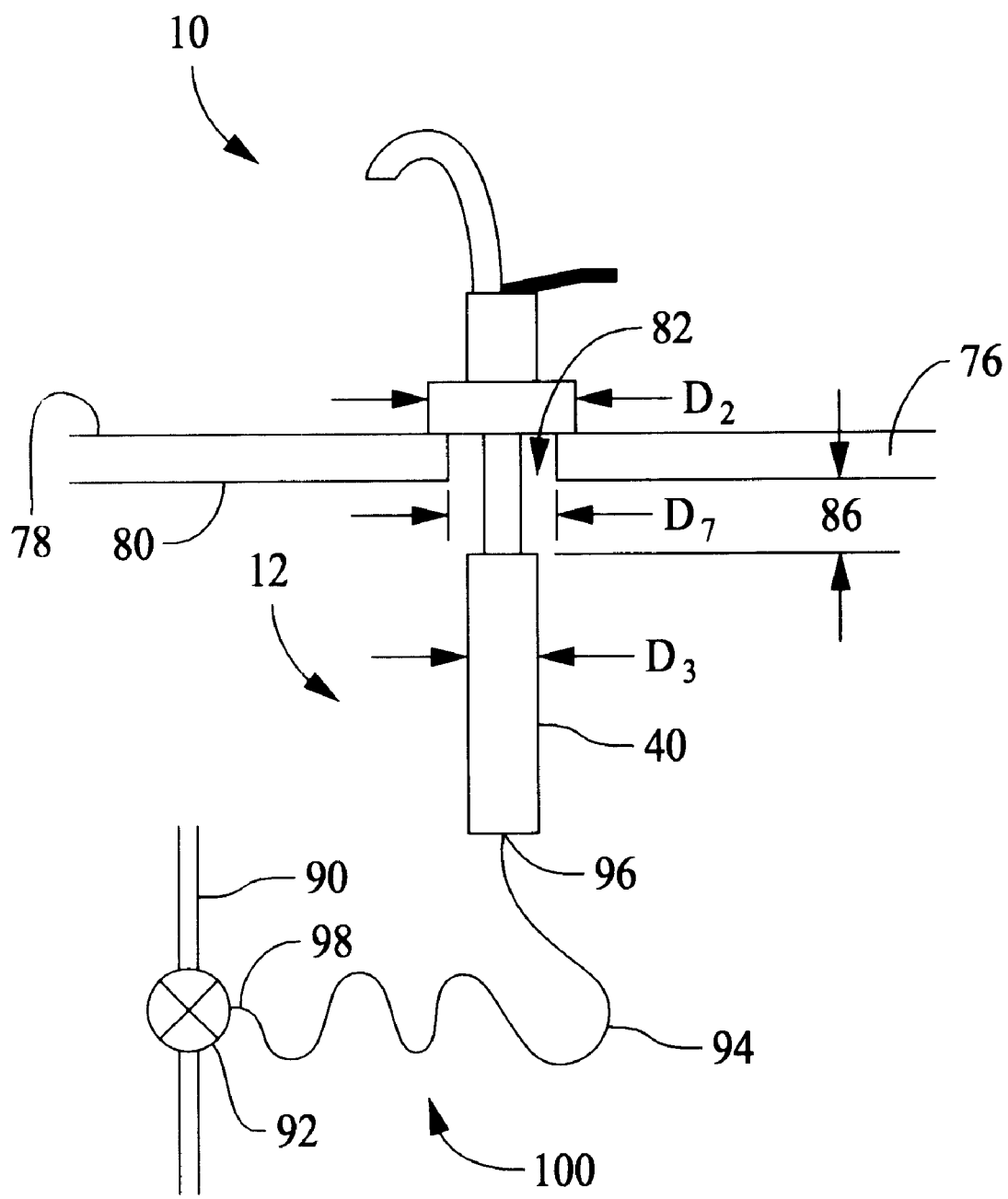
FIG. 2 is a schematic view of the faucet assembly shown in FIG. 1 as installed to the mounting surface.
Figure 3:
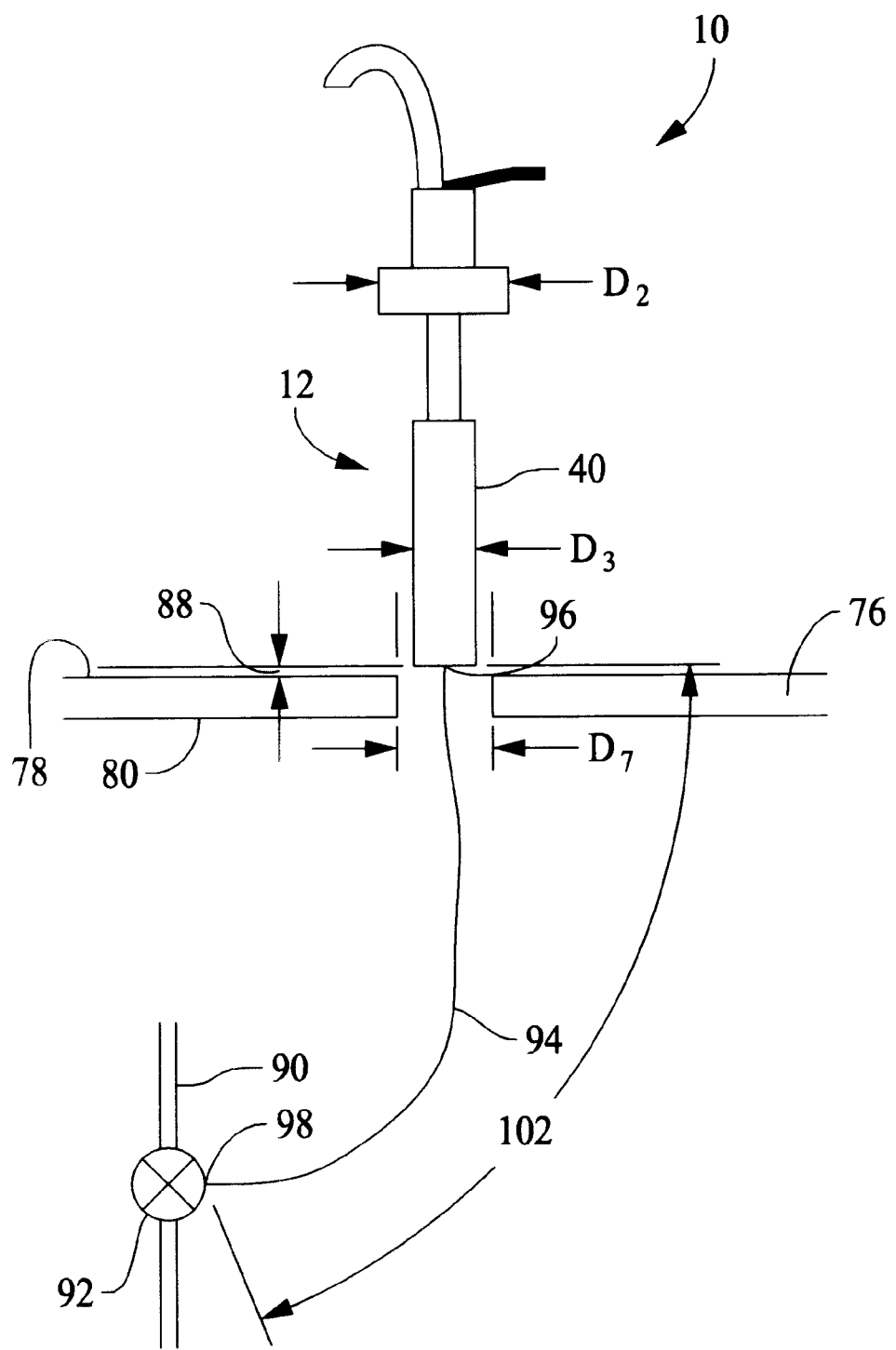
FIG. 3 is a schematic view of the faucet assembly shown in FIG. 1 in a position for replacing the filter.

FIGS. 2 and 3 schematically illustrate faucet assembly 10 installed upon a mounting surface 76 without interlock 60 attached, and faucet assembly 10 detached from mounting surface 76 and positioned for replacement of filter 40, respectively. Mounting surface 76 includes a substantially planar top surface 78 and a substantially planar bottom surface 80. In one embodiment, mounting surface 76 is a countertop. Faucet assembly 10 is attached to top surface 78, and filter assembly 12 is connected to faucet assembly 10 and is located a distance 86 beneath bottom surface 80. An opening 82 extends through mounting surface 76 from top surface 78 to bottom surface 80 and has a diameter $D_7$.

Opening diameter $D_7$ is larger than filter assembly diameter $D_3$ and smaller than faucet assembly base diameter $D_2$. Opening 82 permits faucet assembly 10 to couple to a water source (not shown) while faucet assembly 10 is secured to mounting surface 76. Because opening diameter $D_7$ is larger than filter assembly diameter $D_3$, mounting surface opening 82 also permits filter assembly 12 to be connected to faucet assembly 10 through opening 82 and when filter 40 is replaced. Opening 82 also permits filter assembly 12 to be moved from a distance 86 from beneath bottom surface 80 to a distance 88 above top surface 78.

Faucet assembly 10 is connected to a water line 90 which in turn is connected in flow communication to the water source. In one embodiment, faucet assembly 10 is an auxiliary faucet for providing filtered water and is connected to a water line that is also connected to a main faucet (not shown) that does not provide filtered water. Water line 90 includes a valve 92 used to selectively control a flow of water to faucet assembly 10 through a flexible water line 94. Specifically, if valve 92 is open, water enters filter assembly 12 and if valve 92 is closed, water is prevented from entering filter assembly 12. Accordingly, valve 92 is rotated closed when filter 40 is being replaced.

Flexible water line 94 includes a first end 96, a second end 98, and a surplus length 100 of line that extends between water line first and second ends 96 and 98, respectively. Surplus length 100 is long enough such that a total length 102 of water line 94 extending between water line first and second ends 96 and 98, respectively, is longer than a minimum length (not shown) of water line 94 extending between base 20 and valve 92. Because water line 94 has overall length 102, water line 94 permits filter assembly 12 to be extended through opening 82 from a distance 86 below mounting surface 76 to a distance 88 above mounting surface 76 while flexible water line first end 96 remains removably attached to water valve 92 and flexible water lines second end 98 remains attached to filter 40.

When filter 40 needs replacing, faucet assembly 10 is uncoupled from mounting surface top surface 78. After being uncoupled from mounting surface 76, faucet assembly 10 is elevated above top surface 78 and because filter assembly 12 is coupled to faucet assembly 10 and because flexible water line 94 has total length 102, filter assembly 12 is drawn upward through mounting surface opening 82. When filter assembly 12 is elevated a distance 88 above mounting surface 76, flexible water line 94 becomes taut. When filter assembly 12 is positioned a distance 88 above top surface 76, filter assembly 12 may be uncoupled from faucet assembly 10 and filter 40 may be replaced.

In an alternative embodiment, filter 40 may be replaced by accessing filter assembly 12 below mounting surface 76 and disconnecting filter 40 from filter assembly 12 without detaching faucet assembly 10 from mounting surface 76.

The above described filtered water assembly is cost effective and reliable. The filtered water assembly includes a faucet assembly attached to a mounting surface and a filter assembly below the mounting surface. Because the filter assembly includes a flexible water line and because the filter assembly is sized to be inserted through an opening in the mounting surface, the filter assembly may be drawn upward from below the mounting surface to a position above the mounting surface when the filter needs replacement. As a result, although the filter assembly is disposed below the mounting surface when in operation, the filter may be replaced above the mounting surface in a reliable and cost-effective manner.

While the invention has been described in terms of various specific embodiments, those skilled in the art will recognize that the invention can be practiced with modification within the spirit and scope of the claims.

What is claimed is:

1. A method for installing a water filter to a faucet assembly using a filter assembly, the faucet assembly removably attachable to a mounting surface, the filter assembly sized to be inserted through an opening in the mounting surface, said method comprising the steps of:
   attaching a filter assembly to the faucet assembly in flow communication with a water source;
   attaching a first end of a flexible water line to the filter assembly;
   inserting the filter assembly through the mounting surface opening from a mounting surface top surface to a mounting surface bottom surface; and
   attaching the faucet assembly to the mounting surface.

2. A method in accordance with claim 1 wherein said step of attaching a filter assembly further comprises the step of attaching a filter to the filter assembly.

3. A method in accordance with claim 1 wherein said step of attaching a first end of a flexible water line further comprises the step of attaching a second end of the flexible water line to a water source before attaching the first end of the flexible line to the filter assembly.

4. A method in accordance with claim 1 wherein said step of attaching the faucet assembly further comprises the step of attaching the faucet assembly to the mounting surface top surface.

5. A filtered water assembly for installation to a mounting surface including an opening extending therethrough, said mounting surface further comprising a top surface and a bottom surface and said opening having a first diameter, said filtered water assembly comprising:
   a faucet assembly comprising a base comprising a top surface having a second diameter; and
   a filter assembly in flow communication with said faucet assembly base and disposed a distance from said mounting surface bottom surface, said filter assembly comprising a third diameter, said filter assembly third diameter smaller than said opening first diameter for mounting of said filter assembly from above and below the mounting surface.

6. A filtered water assembly in accordance with claim 5 wherein said filter assembly removably attached to said faucet assembly.

7. A filtered water assembly in accordance with claim 5 wherein said filter assembly comprises a filter and a flexible water line removably attached to said filter.

8. A filtered water assembly in accordance with claim 7 wherein said water line extends between said filter and a water source.

9. A filtered water assembly in accordance with claim 7 wherein said water line is configured to permit said filter assembly to be transitioned a distance from said mounting top surface through said first opening to a distance from said mounting bottom surface.

10. A filtered water assembly in accordance with claim 5 wherein said faucet assembly further comprises a faucet, an aerator, a spout, a spout arm, and a valve, said aerator attached to said spout to control water spray, said spout extending between said faucet and said spout arm, said valve rotatably coupled to said faucet assembly to control a flow of water to said faucet assembly.

11. Apparatus for filtering water, said apparatus comprising:
   a mounting surface comprising a bottom surface, a top surface, and an opening extending therethrough;
   a faucet assembly removably attached to said mounting surface top surface; and
   a filter assembly in flow communication with said faucet assembly and disposed a distance from said mounting surface bottom surface, said filter assembly comprising a second diameter, said opening in said mounting surface having a first diameter larger than said filter second diameter such that said filter assembly is insertable through said opening from said mounting surface bottom surface to said mounting surface top surface.

12. Apparatus in accordance with claim 11 wherein said filter assembly is configured to be removably attached to said faucet assembly from said mounting surface bottom surface.

13. Apparatus in accordance with claim 11 wherein said filter assembly comprises a replaceable filter and a flexible water line removably attached to said filter.

14. Apparatus in accordance with claim 13 wherein said water line extends between said filter and a water source.

15. Apparatus in accordance with claim 13 wherein said water line is configured to permit said filter assembly to be transitioned from a distance from said mounting surface bottom surface through said opening to a distance from said mounting surface top surface.

16. Apparatus in accordance with claim 11 wherein said filter assembly is further configured to be removably attached to said faucet assembly from said mounting surface top surface.

17. Apparatus in accordance with claim 11 wherein said faucet assembly further comprises a body comprising a faucet, a spout, a spout arm, and a valve, said spout extending between said faucet and said spout arm, said valve rotatably coupled to said faucet assembly to control a flow of water to said faucet assembly.

* * * * *